Jan. 25, 1938.  F. NIELSEN  2,106,533
REFLECTOR, IN PARTICULAR FOR VEHICLES
Filed June 27, 1935  3 Sheets-Sheet 1
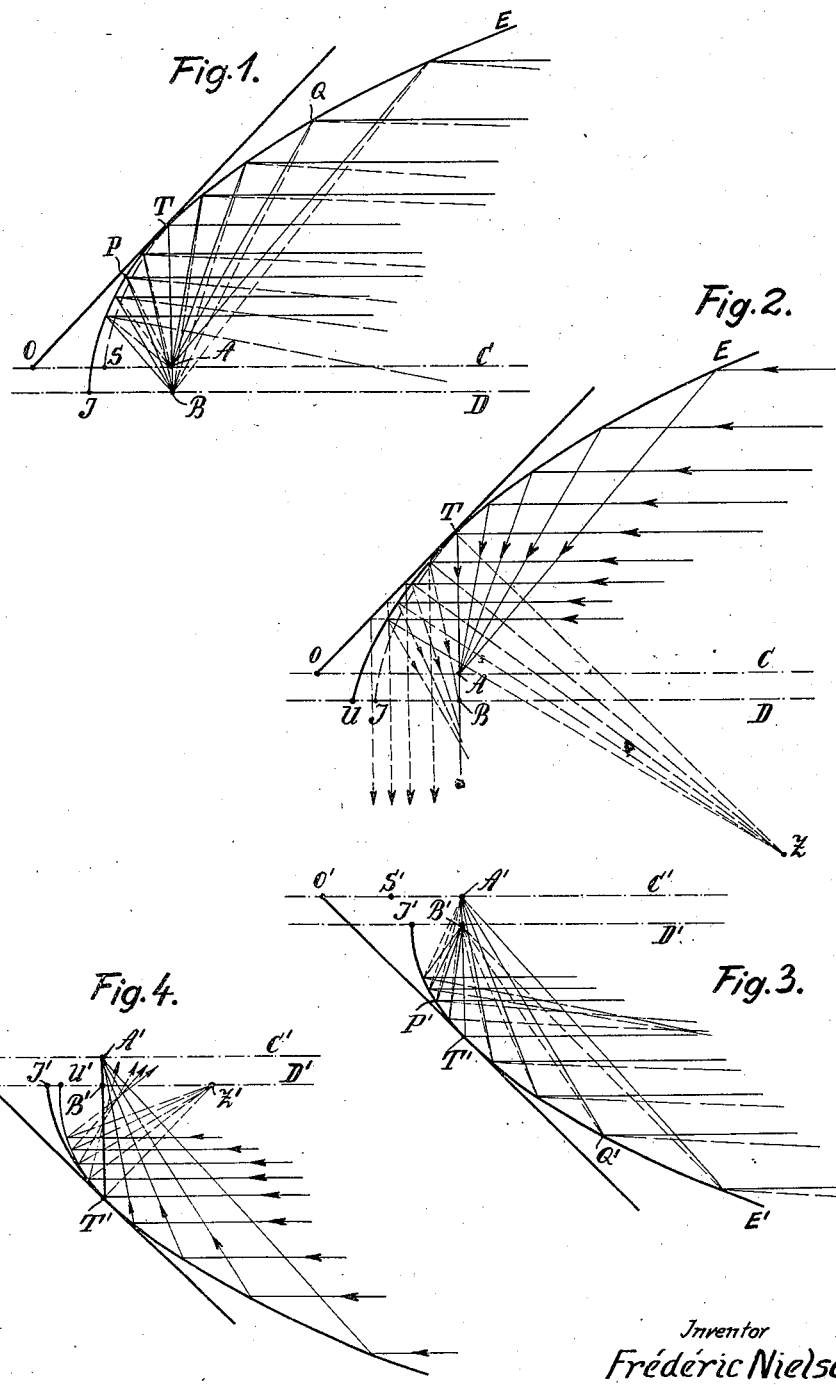

Inventor
Frédéric Nielsen

Jan. 25, 1938.  F. NIELSEN  2,106,533
REFLECTOR, IN PARTICULAR FOR VEHICLES
Filed June 27, 1935   3 Sheets-Sheet 3

Inventor
Frédéric Nielsen
by
Bailey & Carson
Attorney

Patented Jan. 25, 1938

2,106,533

UNITED STATES PATENT OFFICE 2,106,533

REFLECTOR, IN PARTICULAR FOR VEHICLES

Frédéric Nielsen, Mulhouse-Brunstatt, France

Application June 27, 1935, Serial No. 28,717
In France June 30, 1934

7 Claims. (Cl. 240—41.37)

The invention concerns a reflector, in particular for vehicles such as motor vehicles, motor bicycles, bicycles, ships, aircraft, airships and the like.

It has already been proposed to divide reflectors in lamps, for the purpose of obtaining the desired freedom from glare and a good distribution, into two half mirrors with displacement one with regard to the other and displaceable foci. This construction, however, has not hitherto been carried out since essentially the position of the lighting body is subject to limitation, in particular in the centre it is associated with disadvantages in the distribution of the light.

It has also been recommended to arrange the lighting body eccentrically and from 2 to 3 mm. above or below the main axis; however, this gave an undesirable distribution of the light and a glare.

According to the present invention these disadvantages are avoided in that the reflector which consists of two half mirrors is so constructed that each of the two half mirrors in any longitudinal section is limited by two parabola sections of different parameters. The two portions of parabola of each half mirror preferably follow a continuous curve with common tangent at their point of content. The two focal points of each of the two half mirrors are preferably disposed in a plane at right angles or approximately at right angles to the axis of the parabolae or to the axis of rotation or to the main axis of the mirror. The axis of rotation may pass through one of the two focal points, but preferably lies between the two focal points.

According to a preferred embodiment of the invention the parameter of the inner parabolic section of one half mirror is greater, and that of the other half mirror is smaller, than the parameter of the corresponding external parabolic limb. One or both of the inner parabolic sections can be replaced by continuous or discontinuous curves of such form that the rays incident parallel to the axis do not fall in the space between the focus of the outer parabolic limb and the focus of the internal parabolic limb which is to be replaced. Both half mirrors according to the present invention may be so assembled that their axes are coincident or are parallel. Their pairs of focal points may also coincide or may fall at intervals in the axial direction.

According to a further embodiment of the invention the half mirrors are not constructed as surfaces of rotation about a fixed axis but as paraboloid surfaces, the cross sections of which represent Archimedean spirals or circular evolvents or general evolvents, possibly about the cross section of the light source or lines approximating to the said curves. These lines can be so generated that in one half mirror the radius vectors increase from the central longitudinal plane in an approximate 90° rotation to right and to left, whereas the radius vector of the other half mirror decreases in a similar way.

For the purpose of avoiding errors due to total reflection at the glass of the incandescent lamp serving as source of light and for facilitating the manufacture, the half mirrors can be correspondingly recessed at the apex.

According to a particular embodiment of the invention the half mirrors are displaceable relatively to each other and/or to the source of light. Either one half mirror can be displaceable in the direction of the main axis or both half mirrors can be simultaneously and oppositely displaceable in the direction of the main axis in such way that the two pairs of focal points coincide or are spaced apart as desired. Also the entire projector arrangement or both half mirrors or one half mirror can be tiltable about a horizontal axis preferably upwardly and through a small angle. The source of light may be connected with the stationary or with the movable part.

The source of light may according to a suitable embodiment be one with a number of point sources, e. g., a double filament or multi-filament lamp adapted to the positions of the focal points.

In the drawings certain embodiments of the invention are shown by way of example.

Fig. 1 shows a vertical longitudinal section through an upper half mirror according to the invention.

Fig. 2 is a similar embodiment to that shown in Fig. 1 in which the apex curve is replaced by the osculatory circle or the tangent to the outer parabola.

Fig. 3 shows a vertical longitudinal section through a lower half mirror according to the present invention.

Fig. 4 shows a similar embodiment to that according to Fig. 3 with, however, the replacement of the apex parabola by a circular arc lying within the same.

Figure 5:
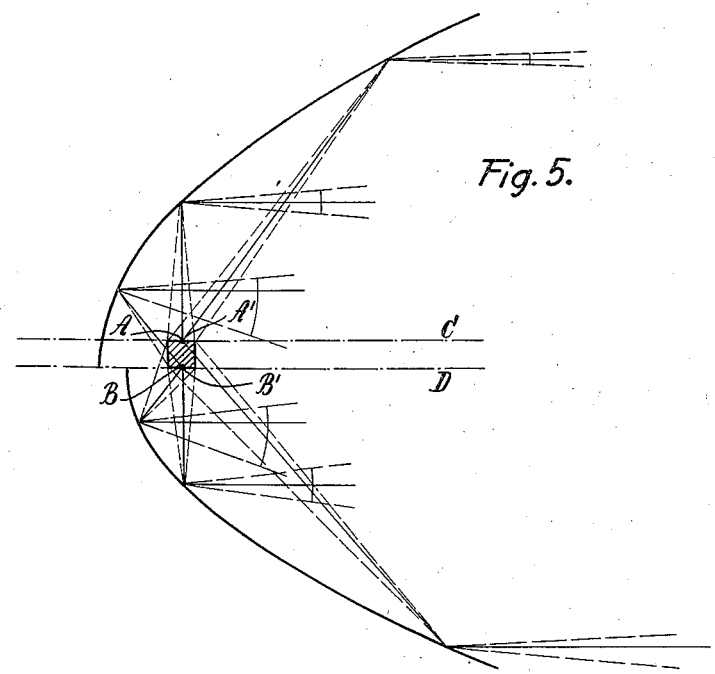
Fig. 5 shows a reflector composed of two half mirrors according to Figs. 1 and 3 in which the two pairs of focal points coincide.
Figure 6:
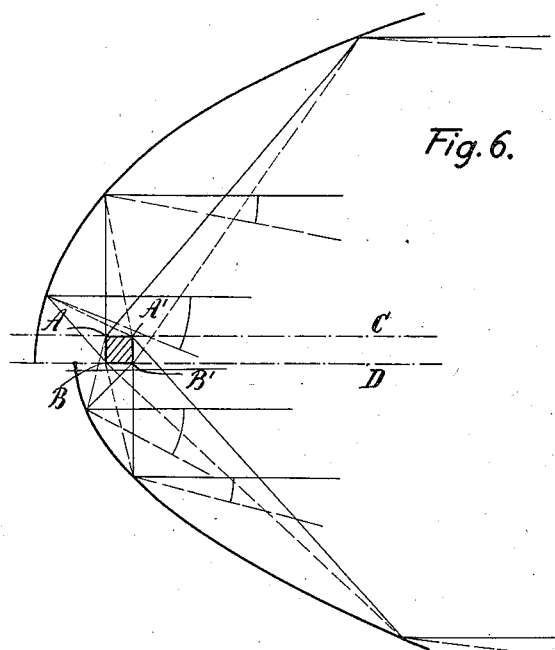

In Fig. 6 an embodiment similar to that shown in Fig. 5 is represented but the two pairs of focal points are arranged approximately at the separation of the thickness of the filament.

Figure 7:
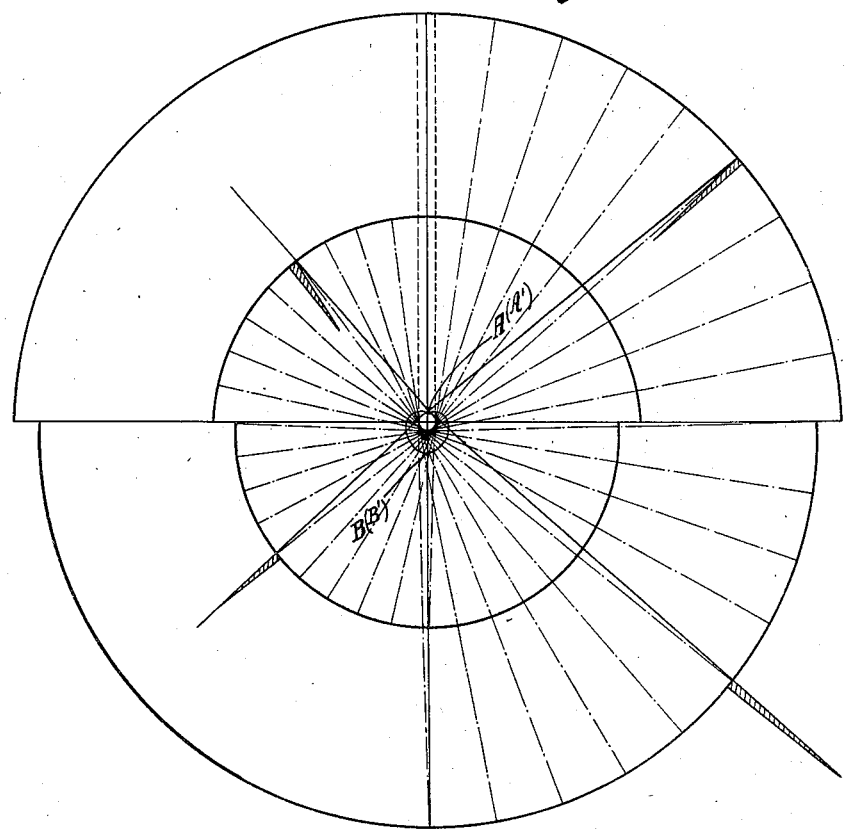

Fig. 7 shows a view at right angles of the axis of the projector in which the cross section of the parabolic sections passes from a circle into a curve following an Archimedean spiral.

Figure 10:
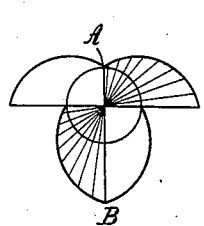
Figure 9:
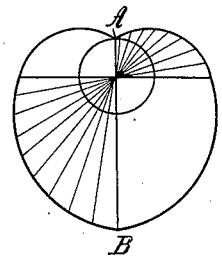
Figure 8:
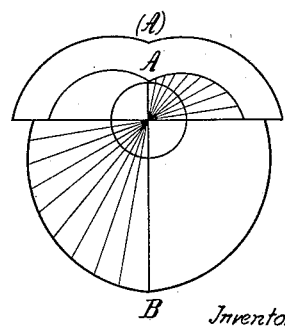

Figs. 8 to 10 show sections through the light source at right angles to the axis wherein the longitudinal extent of the filament extending along the main axis and the curves about the cross section which is assumed to be circular indicate the positions of the focal points or the optical axes for any desired longitudinal section.

As is seen from Fig. 1 the upper half mirror of the projector in contradistinction to the known constructions with a single parabolic curve is according to the present invention defined by two parabolic limbs JT and TE which merge continuously into one another at T so that they have common tangents OT but different focal points A and B as well as different parameters.

The two parabolic sections are so constructed that the inner parabolic section J, T has the larger parameter and the outer parabolic section T, E the smaller parameter and that the focal points A and B lie in the same focal line BAT which is at right angles to the axis SC or at the most is slightly inclined thereto. This arrangement makes it possible to bring the filament close to the focal point A or to the line AB without the parts of the mirror lying between the plane or conical surface BAT passing through the foci and the new apex J commencing to reflect divergently. This is illustrated by means of a light ray. All the rays incident from the focal point A on the corresponding parabola TE are reflected according to the known laws parallel to the axis SAC, e. g., the ray AQ at Q. All the remaining rays are not reflected parallel to the axis but at an angle to the axis so that the reflected ray either crosses the axis (convergent) or becomes progressively further from the axis (divergent). The rays from the space beneath the axis AC and to the right of the line AB are all reflected in the same way as the ray BQ so that for example they cross the axis and thus proceed downwardly. Another ray BP for example would be so reflected from the continuous parabola TS that it would move away from the axis i. e., upwardly. As this ray BP, however, is incident on the parabola TJ which has its focus at B itself this ray also is reflected parallel to the axis. In addition all remaining rays which come from the points above the axis BD and to the right of the line AB are also reflected from the parabola TJ in such manner that they remain beneath the parallel direction, cross the axis and also extend downwardly e. g. the ray AP reflected at the point P. Thus, there is obtained as a characteristic property of such a half mirror that it has a space determined by its two focal points A and B and rectangular or substantially rectangular in cross section from all points within which, the rays are reflected at the mirror in such manner that these reflected rays leave the projector either in a convergent or a parallel beam but never in a divergent beam. The same object would be obtained if the inner mirror portion TJ was not constructed as a parabola but has a continuous or discontinuous curve which satisfies the requirement that it reflects all rays parallel to the axis in such manner that these reflected rays intersect the straight line TAB extending through the transition point T and the focal point A either outside the point B or in the limit at the point B. Examples are for example the osculatory circle TU to the parabola TJ from the centre Z, or the transition tangent TO (see Fig. 2). The parabola TJ which was first described with the focal point B is a limiting case on one side.

Fig. 3 shows a mirror, in principle the same, which is primarily intended for divergent reflection and the axis of rotation of which may correspond to A′ C′ or B′ D′ or can lie between these two straight lines. Here the inner parabolic section T″ J′ has the smaller parameter. All reference letters in Fig. 3 have the same significance as in Fig. 1. Here in the converse way the filament can be brought up to the immediate vicinity of the focal point A′ or the straight line A′ B′ but in this case from the apex side, i. e., between S′, A′, B′ and J′ without the inner mirror section T′, J′ commencing to reflect convergently (in this case upwardly). The inner parabolic section T″ J′ can also be replaced by a curve lying further inside towards the focal point B′ which substitute curve must satisfy the condition that all rays incident parallel to the axis are so reflected that they pass between the point B′ and the transition point T″ or in the limit through the point B′. An example is a circular arc T′ U′ the centre Z′ of which lies on the axis B′ D′ and which has the tangent O′ T′ in common with the parabolae (see Fig. 4).

For practical constructional purposes it is to be noted that the construction of the inner mirror section according to the parabolae described is more favourable in that the beams emergent from this locality remain comparatively intense in the central zones of the cone of light in spite of the large aperture.

Half mirrors according to Figs. 1 to 4 can be combined to form a reflector in such manner that on the one hand the focal points A and A′ or B and B′ coincide (see Fig. 5) or on the other hand in such manner that these two pairs of focal points are spaced by a distance approximately equal to the length of the filament provided (see Fig. 6). In the latter case the projector is approximately free from glare, with the exception of the effects described below, with the great advantage that due to the very close proximity of the limits of the filament to the focal points primarily to those of the outer mirror sections there is a material increase in luminosity of the central zones and thus a corresponding increase in the range with simultaneous good visibility in respect of width due to the wide beam from the inner mirror portions. Both beams have a cross section extending downwardly and laterally in approximately semi-circular form the upper boundary generally lying horizontally in continuation of the main axis.

In the first case (see Fig. 5) if the centre of the filament is positioned in the plane determined by the four focal points a normal reflector is obtained with a sharply defined beam from the outer mirror portions and the favourable additional feature of a very wide beam from the inner mirror portions the lower half of the beam being materially wider and more intense than the upper part.

In order, however, to obtain complete freedom from dazzle a further phenomenon must be taken into account which is found in all mirrors constructed as surfaces of rotation. It is not possible to attain the filament as a mathematical point or as a mathematical line. In consequence of the deviation of its actual dimensions from the focal point or from the axis in directions at right angles to the axis, most rays on reflection at the mirror do not leave in the planes of a collection of planes arranged about the axis of rotation, but in oblique planes the angular deviation of which from the axis of rotation increases with the eccentricity of the luminous point under consideration and decreases with the distance from the point of reflection. This oblique scattering is unavoidable. There only remains the possibility of making it unilateral so that no rays leave the mirror aggregate in a direction above the horizontal or rising upwardly above the direction of the main axis, i. e., the elimination of rays with a vertically upward component. According to the present invention this may be attained by converting the cross section of the paraboloid from the circular form into a curve the normals of which lie beneath the filament or in the limit are tangential to the filament, e. g. in curves following an Archimedean spiral or a circular evolvent (see Figs. 8 to 10) when the filament has a circular section. In this way the upper half mirror which should reflect mostly convergently, has a larger radius vector in the horizontal plane than in its vertical plane whereas the lower half mirror has a smaller radius vector in the horizontal plane than in the vertical plane (see Fig. 7). The differential quotients of the Archimedean spiral or of the diameters of basic circles of the evolvents remain constant over the entire length of the mirror. In this way if the apex portions are suitably recessed in part in order partially to avoid the rays totally reflected by the glass of the incandescent lamp (straight rays) a form of mirror which can be manufactured comparatively readily in practice is obtained. In practice it is advantageous not to make the differential quotients of the Archimedean spirals or of the basic circle diameters of the series of evolvents larger than is absolutely necessary in view of the dimensions of the filament and of the necessary tolerances, because then the best possible concentration of light is obtained. It is thus also advantageous, as shown in the example, to arrange the longitudinal extent of the filament in the direction of the axis. It is, however, also possible to carry out the present invention for a filament disposed transversely to the main axis in horizontal or vertical orientation but such an arrangement is less favourable. In such cases it is necessary to depart from the Archimedean spirals or the circular evolvents in favour of other series of curves constructed in accordance with the more general stipulations previously referred to. In any case the focal points A and A' or B and B' must be separated from one another in the vertical longitudinal section (see Figs. 1 and 3) to such an extent that the initially described regularity of the profile of the mirror remains also in the horizontal longitudinal sections and thus, of course, in every other longitudinal section of the mirror aggregate (see also Figs. 8 to 10). The transition of the right and left hand sides of the mirror upwardly or downwardly can be effected upwardly by a short tangential line or by a short arc and downwardly either directly or also by means of a short arc in such manner that the function is not detrimentally affected. The aggregate of two half mirrors the longitudinal profiles of which are fundamentally those of Fig. 1 and 3 and the cross sectional profile of which is fundamentally that of Fig. 7 affords when assembled in accordance with Fig. 6 a projector entirely free from dazzle and in the assembly according to Fig. 5 a normal projector which is materially improved in its effect. It is readily possible to construct the dazzle-free arrangement so as to be convertible into the normal arrangement by means of a control for example by making both half mirrors displaceable simultaneously parallel to the main axis in opposite directions mechanically or electromagnetically until both planes passing through the focal points pass through the centre of the filament. This simultaneous displacement of the two half mirrors gives the desired normal light the greatest range and intensity in the central zone which can be attained. The displacement of only one mirror into the corresponding position is certainly simpler from the mechanical point of view but is not so favourable from optical standpoints. Also on the assumption that the projector is fixed in the dazzle-free arrangement a double or multi-filament lamp can be constructed which takes account of the particular position of the foci and enables a "normal" light to be obtained by switching over the filaments.

With a good non-dazzling projector with sufficiently wide range according to the invention it is possible to use this as a general practice and only to use the exposed light in special circumstances, whereas the reverse is the case with existing equipment. Then it is not so important that the exposed light should have the best possible effect but that the screened light should have the best possible effect.

Now according to the present invention and as can be seen from Figs. 6 and 7 in combination with Figs. 8, 9 and 10 it is also possible to obtain the exposed light in a different way. This can be effected by displacing the lamp together with the filament laterally and in the vertical plane at right angles to the axis either upwardly or downwardly so that the filament passes over the axis A, A' or beneath the axis B, B'. In the former case light diverging upwardly and converging downwardly is obtained from the outer mirror sections. In the second case the same is obtained from the inner mirror sections. This applies, of course, only for the part of the mirror surfaces lying close to the vertical plane. For remote illumination the displacement upwardly is materially more favourable.

The same effect can also be obtained if a second or third filament is provided at the corresponding points, i. e. at one or both points.

Further with a projector in dazzle-free arrangement according to the present invention another proposal can be carried out with complete success for the first time, this proposal having already been indicated. Hitherto experiments have been made to obtain dazzle-free light by lowering the beam of light. According to the present invention it is possible by slightly tilting the projector or its mirror arrangement or a half mirror to obtain a good "open" illumination which affords the great advantage that it extends only so far above the ground as is requisite for adequate vision. As before, the beam of light remains limited horizontally at the top and the half cone otherwise extending upwardly to a considerable extent in superfluous manner is dispensed with. The upper boundary of the light which with the screened projector according to the present invention lies at about a height of 1 m. gives for example with an inclination of 1° a height of about 4.5 m. at a distance of 200 m. this being over its full width so that a very good visibility is ensured. The darkness of the upper space which is maintained has been found by experience to have a very favourable and protective effect on the eyes of the driver.

This relatively small twisting can be effected with simple mechanical or electrical means. The undesired influences of vibrations can be entirely excluded.

In order to keep the light as condensed as possible in the centre of the space to be illuminated, the focal points must not be too remote from the boundary of the light source. The separation must in any case be less than 2 mm. and it is of very particular importance that according to the present invention two focal points (in longitudinal section) and two focal lines (in space) and correspondingly also two optical axes (in longitudinal section) or surfaces thereby (in space) are available.

What I claim is:

1. A reflecting system comprising a source of light and a reflector, said reflector being composed of an upper part and a lower part, said parts lying on opposite sides of the reflector axis, each part having an outer limb and an inner limb, the outer limbs comprising in section parabolic curves having focal points which lie on a line extending above and parallel to said axis, said inner limbs comprising in section curves continuous with said outer limbs from tangent points lying on planes extending normal to said axis and passing through the focal points of said outer limbs, said source of light being positioned below said line, and said parts being adapted and arranged to reflect all light rays entering said reflector parallel to said axis so that they do not enter the space between the focal points of said outer limbs and the lower end of said source of light.

2. A reflecting system as in claim 1, said inner limbs consisting of parabolic curves, the parameter of the inner limb being greater than the parameter of the outer limb in said upper part, and the parameter of the inner limb being less than the parameter of the outer limb in said lower part.

3. A reflector composed of two half reflectors arranged above and below the axis of the reflector, each half consisting in section of an inner parabolic limb and an outer parabolic limb, the parameter of the inner limb being larger than the parameter of the outer limb in said upper half, and the parameter of the inner limb being less than the parameter of the outer limb in said lower half, each half having two focal points vertically spaced from each other and lying in a plane extending normal to said axis and intersecting the half reflector at the juncture of said inner and outer limbs, the focal points of the inner and outer limbs, respectively, lying on lines extending parallel to said axis.

4. A reflector as in claim 3, said plane in said upper half reflector being spaced longitudinally of said axis from the plane of said lower half reflector.

5. A system as in claim 1, all sections of each part reflector taken on planes extending transversely to and normal of said axis forming curves all the normals of which do not touch the profile of the transverse section of the illuminating body.

6. A system as in claim 1, all sections of each part reflector taken on a plane extending transversely of said axis and normal thereto being in the form of circular arcs, the radial vectors of one of said parts being increased in the quadrants lying on each side of a longitudinal plane intersecting said arcs, while the radial vectors of the other of said parts are decreased in a similar manner.

7. A reflector composed of two half reflectors arranged on opposite sides of the axis of the reflector, each half consisting of, in longitudinal section, an outer parabolic limb and a curved inner limb continuous with said outer limb, the focal points of the two outer limbs lying in a line parallel to said axis, said inner limbs joining said outer limbs at the point of intersection of a plane normal to said axis and passing through the focal point of an outer limb with a half reflector, all sections of each half reflector taken on planes transversely of and normal to said axis being in the form of Archimedean spirals.

FRÉDÉRIC NIELSEN.